(12) United States Patent  
Oyama et al.

(10) Patent No.: US 11,119,260 B2  
(45) Date of Patent: Sep. 14, 2021

(54) OPTICAL SHEET AND OPTICAL COMPONENT

(71) Applicant: SUMITOMO BAKELITE CO., LTD., Shinagawa-ku (JP)

(72) Inventors: Takuya Oyama, Shinagawa-ku (JP); Tetsuya Ishikawa, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 16/651,818

(22) PCT Filed: Sep. 27, 2018

(86) PCT No.: PCT/JP2018/036150  
§ 371 (c)(1),  
(2) Date: Mar. 27, 2020

(87) PCT Pub. No.: WO2019/065927  
PCT Pub. Date: Apr. 4, 2019

(65) Prior Publication Data  
US 2020/0249378 A1 Aug. 6, 2020

(30) Foreign Application Priority Data  
Sep. 29, 2017 (JP) .............................. JP2017-192233

(51) Int. Cl.  
*G02B 5/20* (2006.01)  
*G02B 5/30* (2006.01)  
*G02C 7/10* (2006.01)

(52) U.S. Cl.  
CPC .............. *G02B 5/208* (2013.01); *G02B 5/30* (2013.01); *G02C 7/10* (2013.01)

(58) Field of Classification Search  
CPC . G02B 5/208; G02B 5/30; G02B 5/22; G02B 5/3025; G02B 5/20; G02C 7/10; G02C 7/108; G02C 7/12  
See application file for complete search history.

(56) References Cited

U.S. PATENT DOCUMENTS

| 2007/0076166 A1 | 4/2007 | Kobuchi et al. |
| 2012/0206689 A1 | 8/2012 | Ohkubo et al. |

(Continued)

FOREIGN PATENT DOCUMENTS

| EP | 2 765 448 A1 | 8/2014 |
| FR | 2 891 370 A1 | 3/2007 |

(Continued)

OTHER PUBLICATIONS

Kangshin, Johoku Chemical UV Absorber, JF-79 Absorption Curve, 4 pages, http://kangshin.com/%EC%9D%BC%EB%B3%B8-johoku-chemical%EC%9D%98-uv-absorber/, available as of Feb. 19, 2018, accessed on Nov. 18, 2020 (Year: 2018).*

(Continued)

*Primary Examiner* — Derek S. Chapel  
*Assistant Examiner* — Adam W Booher  
(74) *Attorney, Agent, or Firm* — Oblon, McClelland, Maier & Neustadt, L.L.P.

(57) ABSTRACT

An optical sheet of the present invention is an optical sheet that has flexibility and is used in a curved state of being curved in one direction, and includes a polarized layer 12 that polarizes incident light and a specific wavelength absorption layer provided on a curved concave side from the polarized layer 12 and containing a resin material and a light absorbing agent that absorbs light in a specific wavelength range out of light in a wavelength range of 350 nm to 740

(Continued)

nm. In addition, the resin material is preferably a polycarbonate having a viscosity average molecular weight Mv of 20,000 to 30,000.

21 Claims, 3 Drawing Sheets

(56) References Cited

U.S. PATENT DOCUMENTS

| | | | |
|---|---|---|---|
| 2014/0375945 A1 | 12/2014 | Tokumaru et al. | |
| 2015/0284522 A1* | 10/2015 | Hojo | C08J 5/18 359/492.01 |
| 2015/0355395 A1 | 12/2015 | Kimura et al. | |
| 2015/0362728 A1 | 12/2015 | Tei | |
| 2016/0011338 A1* | 1/2016 | Li | G02B 5/26 252/587 |
| 2016/0320638 A1* | 11/2016 | Jallouli | G02C 7/104 |
| 2018/0355178 A1 | 12/2018 | Yamada et al. | |
| 2019/1185663 | 6/2019 | Kawai | |

FOREIGN PATENT DOCUMENTS

| | | |
|---|---|---|
| JP | 9-5683 A | 1/1997 |
| JP | 11-199683 A | 7/1999 |
| JP | 2003-149605 A | 5/2003 |
| JP | 2003-519398 A | 6/2003 |
| JP | 2005-037590 A | 2/2005 |
| JP | 2007-93927 A | 4/2007 |
| JP | 2012-219169 A | 11/2012 |
| JP | 2012-226078 A | 11/2012 |
| JP | 2014-197163 A | 10/2014 |
| JP | 2016-53724 A | 4/2016 |
| JP | 2016-104839 A | 6/2016 |
| JP | 2017-56685 A | 3/2017 |
| WO | WO 01/49478 A2 | 7/2001 |
| WO | WO 2009/014050 A1 | 1/2009 |
| WO | WO 2011/049108 A1 | 4/2011 |
| WO | WO 2011/149030 A1 | 12/2011 |
| WO | WO 2013/051723 A1 | 4/2013 |
| WO | WO 2014/073021 A1 | 5/2014 |
| WO | WO 2014/115705 A1 | 7/2014 |
| WO | WO 2017/073220 A1 | 5/2017 |
| WO | WO 2017/110598 A1 | 6/2017 |

OTHER PUBLICATIONS

IHS Markit, JIS K 7210-1, https://global.ihs.com/doc_detail.cfm?document_name=JIS%20K%207210%2D1&item_s_key=00632330&item_key_date=850309, available as of Sep. 22, 2014, accessed on Nov. 18, 2020 (Year: 2014).*

American Elements, Fullerene-C60, https://www.americanelements.com/fullerene-c60-99685-96-8, accessed Nov. 18, 2020 (Year: 2020).*

International Search Report dated Oct. 30, 2018 in PCT/JP2018/036150 filed on Sep. 27, 2018, 1 page.

Japanese Office Action drafted on Jul. 26, 2018 in Japanese Patent Application No. 2017-192233 filed on Sep. 29, 2017 (with English language translation), 8 pages.

Japanese Office Action drafted on Nov. 8, 2018 in Japanese Patent Application No. 2017-192233 filed on Sep. 29, 2017 (with English language translation), 9 pages.

* cited by examiner

OPTICAL SHEET AND OPTICAL COMPONENT

TECHNICAL FIELD

The present invention relates to an optical sheet and an optical component.

BACKGROUND ART

For example, there is known an optical sheet that absorbs a specific wavelength range from incident light for the purpose of enhancing the contrast of a visual field or preventing glare (for example, refer to PTL 1). This optical sheet is used by being attached to eyeglasses, sunglasses, sun visors, and the like.

The optical sheet disclosed in PTL 1 includes a resin material and a dye (light absorbing agent) that is contained in the resin material and absorbs light of a specific wavelength out of light in a visible light region, for example. This optical sheet is mold into a sheet shape by mixing a dye in a molten resin material, performing extrusion molding in the state, and then cooling thereof, for example.

In a case where such an optical sheet is laminated on a lens, for example, it is possible to use a so-called sheet insert method in which the optical sheet is placed in a mold and a resin material to be a lens is supplied thereon to integrally form the lens and the optical sheet.

However, in a case where the optical sheet disclosed in PTL 1 is applied to the sheet insert method, the dye (light absorbing agent) may be changed in quality by heat transmitted directly from the mold.

CITATION LIST

[PTL 1] WO2014/115705

SUMMARY OF INVENTION

Technical Problem

An object of the present invention is to provide an optical sheet and an optical component excellent in moldability and optical characteristics.

Solution to Problem

Such an object is achieved by the present invention of the following (1) to (9).

(1) An optical sheet having flexibility and used in a curved state of being curved in one direction, the optical sheet including
a polarized layer for polarizing incident light; and
a specific wavelength absorption layer that is provided on a curved concave side from the polarized layer and includes a resin material and a light absorbing agent that absorbs light in a specific wavelength range out of light in a wavelength range of 350 nm to 740 nm.

(2) The optical sheet according to (1), in which the resin material is a polycarbonate having a viscosity average molecular weight Mv of 20,000 to 30,000.

(3) The optical sheet according to (2), in which the polycarbonate has a melt flow rate of 3 g/10 min to 30 g/10 min measured in accordance with JIS K7210.

(4) The optical sheet according to (2) or (3), in which the polycarbonate has a water absorption rate of 0.02% to 0.2%.

(5) The optical sheet according to any one of (1) to (4), in which in a case where a melting point of the polycarbonate is denoted by T1 and a melting point of the light absorbing agent is denoted by T2, T1<T2 is satisfied.

(6) The optical sheet according to any one of (1) to (5), in which the specific wavelength absorption layer has a stretching degree of 10% or less.

(7) The optical sheet according to any one of (1) to (6), in which the specific wavelength absorption layer further includes an ultraviolet absorbing agent that absorbs light in a wavelength range of 100 nm to 420 nm.

(8) The optical sheet according to any one of (1) to (7), in which the light absorbing agent contains at least one selected from the group consisting of a phthalocyanine-based pigment, a porphyrin-based compound, and a merocyanine dye.

(9) An optical component comprising:
a substrate; and
the optical sheet according to any one of (1) to (8), which is laminated on the substrate.

Advantageous Effects of Invention

According to the present invention, it is possible to provide an optical sheet and an optical component that can provide an optical sheet and an optical component excellent in moldability and optical characteristics.

DESCRIPTION OF EMBODIMENTS

Hereinafter, an optical sheet and an optical component of the present invention will be described in detail based on preferable embodiments shown in the accompanying drawings.

First Embodiment

Figure 1:
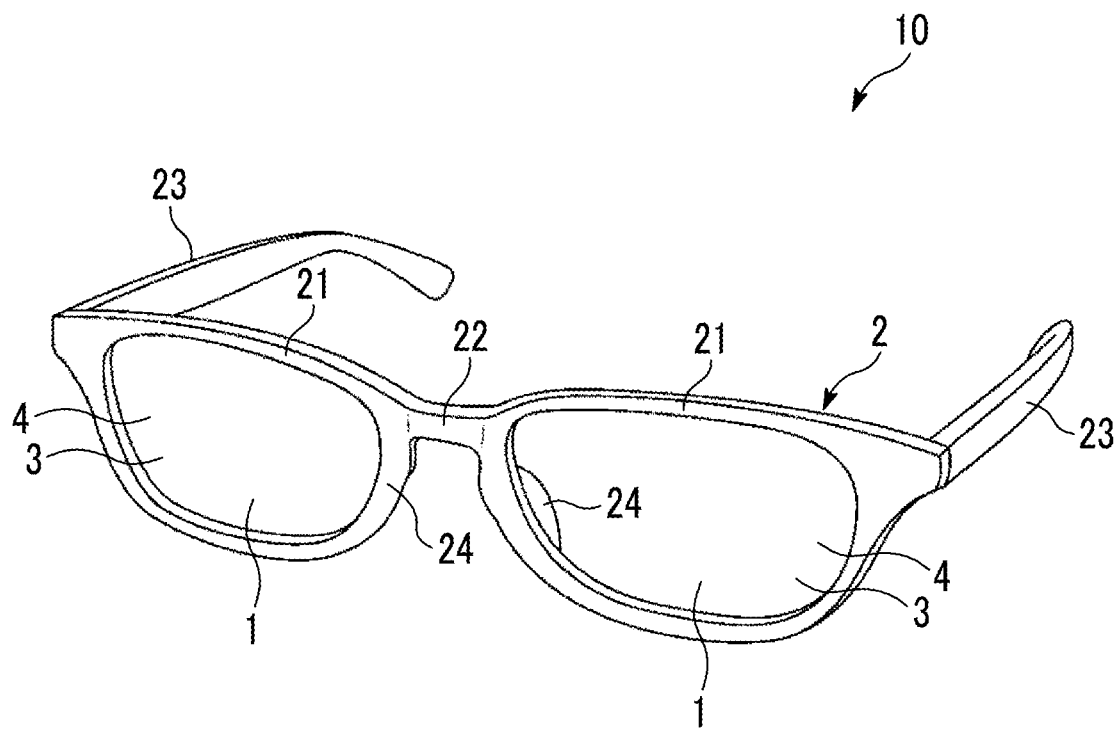
FIG. 1 is a perspective view of a sunglass including an optical sheet (first embodiment) of the present invention.
Figure 2:
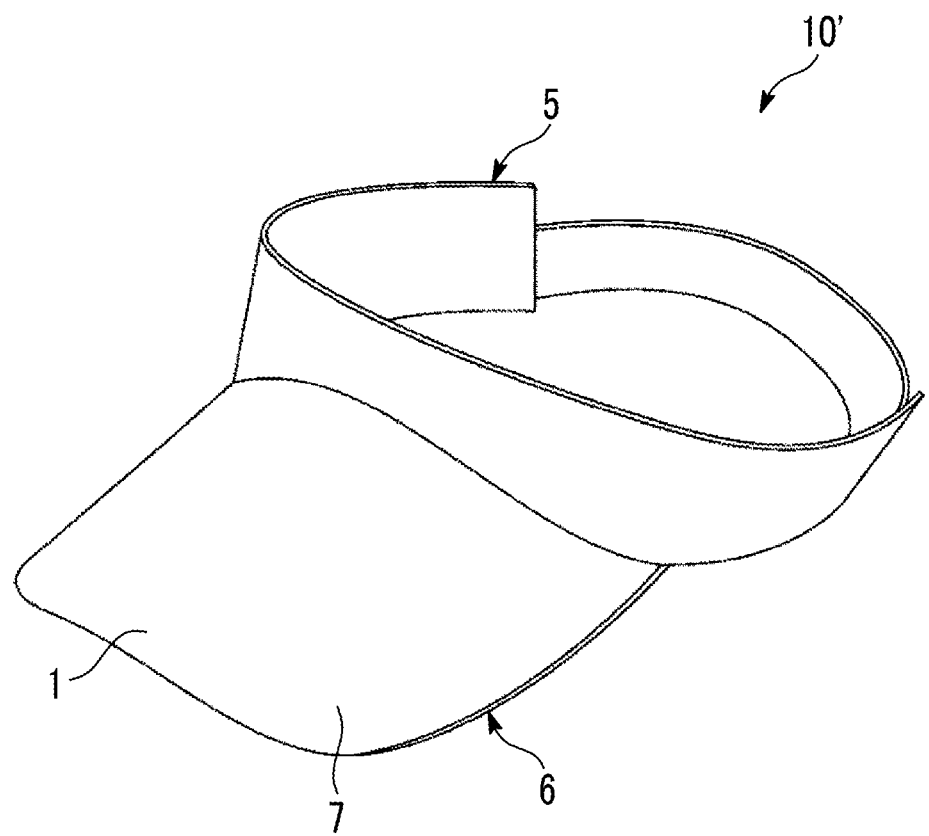
FIG. 2 is a perspective view of a sun visor including the optical sheet (first embodiment) of the present invention.
Figure 5:
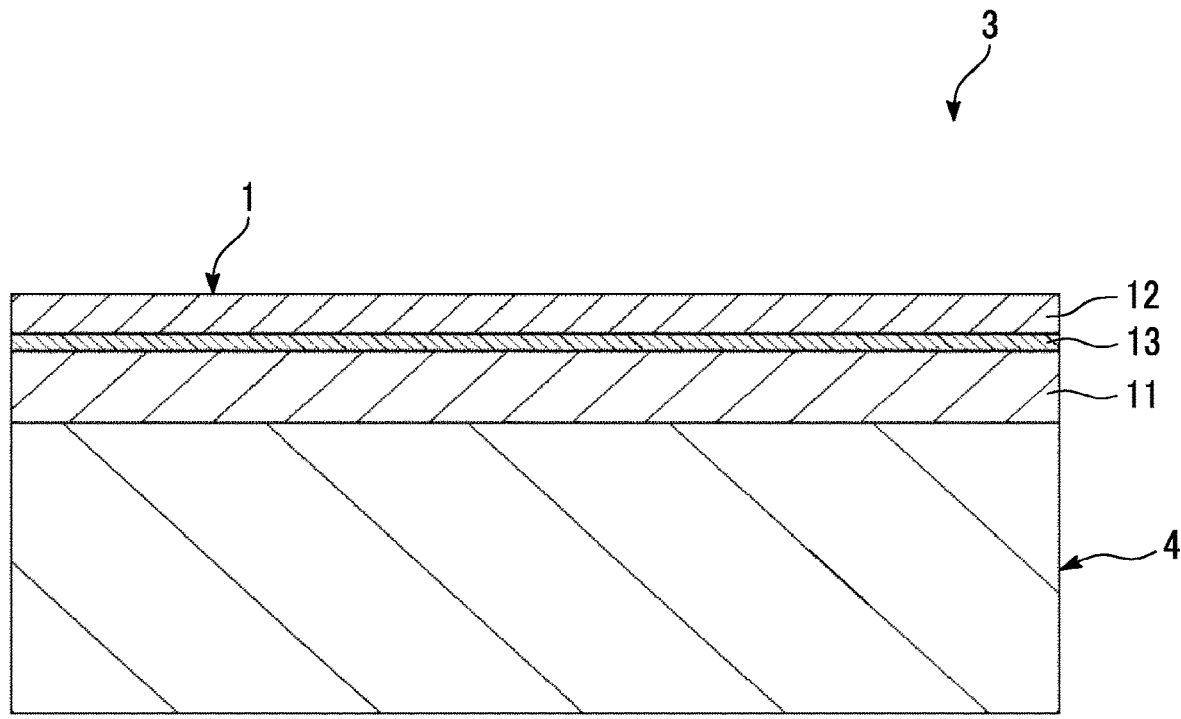
FIG. 5 is a sectional view of the optical component shown in FIG. 1.

FIG. 1 is a perspective view of a sunglass including the optical sheet (first embodiment) of the present invention. FIG. 2 is a perspective view of a sun visor including the optical sheet (first embodiment) of the present invention. FIG. 5 is a sectional view of the optical component shown in FIG. 1.

In FIGS. 1, 2, and 5 (the same also applies to FIG. 6), the upper side is referred to as "upper direction" or "upper", and the lower side is referred to as "lower direction" or "lower". In addition, in the drawings referred to in the present specification, dimensions in a thickness direction are exaggeratedly illustrated, and are significantly different from actual dimensions.

The optical sheet 1 of the present invention shown in FIGS. 1, 2, and 5 is an optical sheet having flexibility and used in a curved state of being curved in one direction, and the optical sheet includes a polarized layer for polarized incident light and a specific wavelength absorption layer which is provided in a curved concave side from the polarized layer and contains a resin material, and a light absorbing agent that absorbs light in a specific wavelength range out of light in a wavelength range of 350 nm to 740 nm.

With this, the optical sheet 1 has a polarizing function and can absorb light of a specific wavelength. In addition, in a case where the optical sheet 1 is placed on a mold, and a resin material to be the lens 4 is supplied thereon to form a lens with an optical sheet (optical component 10) in which the lens 4 and the optical sheet 1 are integrated, it is possible to prevent the mold and the specific wavelength absorption layer from being brought into contact with each other. Therefore, it is possible to prevent the specific wavelength absorption layer from being changed in quality by the heat directly transmitted from the mold. As described above, the optical sheet 1 is excellent in moldability and optical characteristics.

Such optical sheet 1 is used for a sunglass (optical component 10) shown in FIG. 1 and a sun visor (optical component 10') shown in FIG. 2.

As shown in FIG. 1, the sunglass (optical component 10) includes a frame 2 mounted on a user's head, and a lens 3 with an optical sheet (optical component) fixed to the frame 2. In the present specification, the term "lens" includes both of a lens having a light collecting function and a lens not having a light collecting function.

As shown in FIG. 1, the frame 2 is mounted on the head of the user, and includes a rim portion 21, a bridge portion 22, a temple portion 23 that can be hung on the user's ear, and a nose pad portion 24. Each rim portion 21 has a ring shape, and is a portion where the lens 3 with an optical sheet is mounted inside.

The bridge portion 22 is a portion that connects each rim portion 21. The temple portion 23 has a vine shape and is connected to an edge of each rim portion 21. The temple portion 23 is a portion that can be hung on the user's ear. The nose pad portion 24 is a portion that comes into contact with the user's nose in a mounting state in which the sunglass (optical component 10) is mounted on the user's head. With this, it is possible to reliably maintain the mounting state.

A shape of the frame 2 is not limited to the illustrated one as long as the frame 2 can be mounted on a user's head.

The optical component of the present invention includes a lens 4 (substrate) and an optical sheet 1 laminated on a surface of the lens 4 on the front side (side opposite to human eyes in a mounted state). With this, it is possible to exhibit a function as a sunglass while enjoying advantages of the optical sheet 1 described above.

As shown in FIG. 2, the sun visor (optical component 10') includes a ring-shaped mounting portion 5 mounted on a user's head and a collar 6 provided in front of the mounting portion 5. The collar 6 includes a light transmitting member 7 (substrate) and the optical sheet 1 provided on an upper surface of the light transmitting member 7. With this, it is possible to exhibit a function as a sun visor while enjoying advantages of the optical sheet 1 described above.

Constituent materials of the lens 4 and the light transmitting member 7 are not particularly limited as long as the materials have light transmitting properties, and include various resin materials or various glasses. However, the material is preferably the same polycarbonate as the polycarbonate of the optical sheet 1. With this, it is possible to enhance adhesion between the lens 4 or the light transmitting member 7 and the optical sheet 1.

Hereinafter, the optical sheet 1 will be described in detail. In the following, a case of being laminated on the lens (substrate) will be representatively described.

As shown in FIG. 5, the optical sheet 1 includes a specific wavelength absorption layer 11, a polarized layer 12, and an adhesive layer 13 provided therebetween. These are arranged in order of the specific wavelength absorption layer 11, the adhesive layer 13, and the polarized layer 12 from the lens 4 side. Although FIG. 5 illustrates a surface of the lens 4 as a plane, the upper surface of the lens 4 is actually a curved convex surface that is curved upward.

The specific wavelength absorption layer 11 includes a resin material, a light absorbing agent, and an ultraviolet absorbing agent.

Examples of the resin material include polycarbonate, polyamide, and the like.

<Resin Material>
(Polycarbonate)

The polycarbonate is not particularly limited, and various types can be used. Among these, aromatic polycarbonates are preferable. The aromatic polycarbonate includes an aromatic ring in the main chain, and with this, strength of the optical sheet 1 can be further improved.

The aromatic polycarbonate is synthesized by an interfacial polycondensation reaction between bisphenol and phosgene, an ester exchange reaction between bisphenol and diphenyl carbonate, and the like, for example.

Examples of the bisphenol include bisphenol A, bisphenol (modified bisphenol) which is a source of a repeating unit of the polycarbonate represented by the following formula (1), or the like, for example.

[Chem. 1]

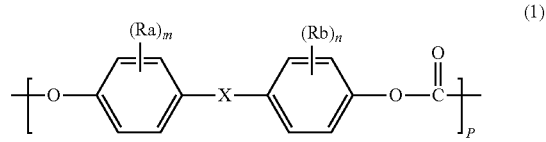

(In the formula (1), X is an alkyl group having 1 to 18 carbon atoms, an aromatic group, or a cycloaliphatic group, Ra and Rb each independently are an alkyl group having 1 to 12 carbon atoms, m and n each independently are an integer of 0 to 4, and p is the number of repeating units.)

Specific examples of the bisphenol that is a source of the repeating unit of the polycarbonate represented by the formula (1) include 4,4'-(pentane-2,2-diyl)diphenol, 4,4'-(pentane-3,3-diyl)diphenol, 4,4'-(butane-2,2-diyl)diphenol, 1,1'-(cyclohexanediyl)diphenol, 2-cyclohexyl-1,4-bis(4-hydroxyphenyl)benzene, 2,3-biscyclohexyl-1,4-bis (4-hydroxyphenyl)benzene, 1,1'-bis (4-hydroxy-3-methylphenyl) cyclohexane, 2,2'-bis (4-hydroxy-3-methylphenyl)propane, and the like, and one or two or more of these can be used in combination.

In particular, as the polycarbonate, bisphenol type polycarbonate having a skeleton derived from bisphenol is preferable as a main component. By using such a bisphenol type polycarbonate, the optical sheet 1 exhibits further excellent strength.

A viscosity average molecular weight Mv of such polycarbonate is preferably 20,000 to 30,000, more preferably 23,000 to 28,000, and particularly preferably 24,000 to 27,500. With this, it is possible to sufficiently enhance the strength of the optical sheet 1. In addition, in a molten state of the polycarbonate, it is possible to sufficiently enhance the fluidity. Accordingly, in a case where the optical sheet 1 is manufactured by extrusion molding, for example, it is possible to perform extrusion molding in a state where the polycarbonate in the molten state and the light absorbing agent are sufficiently mixed with each other. Therefore, it is possible to prevent a state where the light absorbing agent is excessively aggregated after molding. In addition, by setting the viscosity average molecular weight Mv of the polycarbonate within the above numerical value range, sufficient strength is obtained. As a result, aggregation of the light absorbing agent is prevented and sufficient strength is obtained.

In a case where the viscosity average molecular weight Mv of the polycarbonate is too small, there is a possibility that sufficient strength may not be obtained after molding. On the other hand, in a case where the viscosity average molecular weight Mv of the polycarbonate is too large, it is not possible to sufficiently enhance the fluidity in a molten state. For this reason, there is a possibility that mixing of the polycarbonate in a molten state and the light absorbing agent becomes insufficient.

In addition, polycarbonate preferably has a melt flow rate (MFR) of 3 g/10 min to 30 g/10 min, and more preferably 15 g/10 min to 25 g/10 min measured in accordance with JIS K7210. With this, it is possible to sufficiently enhance the fluidity of polycarbonate in a molten state. Therefore, for example, in a case of manufacturing the optical sheet 1 by extrusion molding, it is possible to perform extrusion molding in a state where the polycarbonate in a molten state and the light absorbing agent are sufficiently mixed with each other.

In addition, polycarbonate preferably has a water absorption rate of 0.02% to 0.2%, and more preferably has a water absorption rate of 0.04% to 0.15%. With this, it is possible to perform extrusion molding in a state where the polycarbonate in a molten state and the light absorbing agent are sufficiently mixed with each other. Therefore, it is possible to prevent the light absorbing agent from being excessively aggregated.

In addition, the water absorption rate in the present specification is a value measured by Aquatrac 3E (manufactured by Brabender Corporation).

In addition, a content of polycarbonate in the specific wavelength absorption layer 11 is preferably 87 wt % to 99.949 wt %, and more preferably 90 wt % to 99.87 wt %. With this, it is possible to reliably exhibit the effect of the present invention.

The resin material is not limited to the polycarbonate, and for example, polyamide and the like can be used.

<Light Absorbing Agent>

The light absorbing agent absorbs light of a specific wavelength. In the present specification, in a case where a value of a maximum absorption wavelength in a visible light region of 420 nm to 780 nm is denoted by λ1, a value on a side in a wavelength of 20 nm lower than λ1 is denoted by λ2, and a value on a side in a wavelength of 20 nm higher than λ1 is denoted by λ3, the expression "absorb light" means that the absorbance λ1/λ2 or the absorbance λ1/λ3 is 1.0 or more.

The light absorbing agent is not particularly limited as long as the light absorbing agent absorbs light of a specific wavelength out of light in a wavelength range of 350 nm to 780 nm, and examples thereof include a quinoline-based coloring agent, an anthraquinone-based coloring agent, and a perylene-based coloring agent. Among these, one or two or more can be used in combination.

Examples of the quinoline-based coloring agent include alkyl-substituted quinoline compounds such as 2-methylquinoline, 3-methylquinoline, 4-methylquinoline, 6-methylquinoline, 7-methylquinoline, 8-methylquinoline, 6-isopropylquinoline, 2,4-dimethylquinoline, 2,6-dimethylquinoline, and 4,6,8-trimethylquinoline, amine group-substituted quinoline compounds such as 2-aminoquinoline, 3-aminoquinoline, 5-aminoquinoline, 6-aminoquinoline, 8-aminoquinoline, and 6-amino-2-methylquinoline, alkoxy-substituted quinoline compounds such as 6-methoxy-2-methylquinoline and 6,8-dimethoxy-4-methylquinoline, and halogen-substituted quinoline compounds such as 6-chloroquinoline; 4,7-dichloroquinoline, 3-bromoquinoline, and 7-chloro-2-methylquinoline.

By blending such a quinoline-based coloring agent, it is possible to absorb light in a wavelength range of 350 nm to 550 nm out of light incident on the specific wavelength absorption layer 11. It is preferable to have an absorption peak in a wavelength range of 400 nm to 550 nm.

Examples of the anthraquinone-based coloring agent include (1) 2-anilino-1,3,4-trifluoroanthraquinone, (2) 2-(o-ethoxycarbonylanilino)-1,3,4-trifluoroanthraquinone, (3) 2-(p-ethoxycarbonylanilino)-1,3,4-trifluoroanthraquinone, (4) 2-(m-ethoxycarbonylanilino)-1,3,4-trifluoroanthraquinone, (5) 2-(o-cyanoanilino)-1,3,4-trifluoroanthraquinone, (6) 2-(p-cyanoanilino)-1,3,4-trifluoroanthraquinone, (7) 2-(m-cyanoanilino)-1,3,4-trifluoroanthraquinone, (8) 2-(o-nitroanilino)-1,3,4-trifluoroanthraquinone, (9) 2-(p-nitroanilino)-1,3,4-trifluoroanthraquinone, (10) 2-(m-nitroanilino)-1,3,4-trifluoroanthraquinone, (11) 2-(p-tert-butylanilino)-1,3,4-trifluoroanthraquinone, (12) 2-(o-methoxyanilino)-1,3,4-trifluoroanthraquinone, (13) 2-(2,6-diisopropylanilino)-1,3,4-trifluoroanthraquinone, (14) 2-(2,6-dichloroanilino)-1,3,4-trifluoroanthraquinone, (15) 2-(2,6-difluoroanilino)-1,3,4-trifluoroanthraquinone, (16) 2-(3,4-dicyanoanilino)-1,3,4-trifluoroanthraquinone, (17) 2-(2,4,6-tri(loloanilino)-1,3,4-trifluoroanthraquinone, (18) 2-(2,3,5,6-tetrachloroanilino)-1,3,4-trifluoroanthraquinone, (19) 2-(2,3,5,6-tetrafluoroanilino)-1,3,4-trifluoroanthraquinone, (20) 3-(2,3,4,5-tetrafluoroanilino)-2-butoxy-1,4-difluoroanthraquinone, (21) 3-(4-cyano-3-chloroanilino)-2-octyloxy-1,4-difluoroanthraquinone, (22) 3-(3,4-dicyanoanilino)-2-hexyloxy-1,4-difluoroanthraquinone, (23) 3-(4-cyano-3-chloroanilino)-1,2-dibutoxy-4-fluoroanthraquinone, (24) 3-(p-cianoanilino)-2-phenoxy-1,4-difluoroanthraquinone, (25) 3-(p-cyanoanilino)-2-(2,6-diethylphenoxy)-1,4-difluoroanthraquinone, (26) 3-(2,6-dichloroanilino)-2-(2,6-dichlorophenoxy)-1,4-difluoroanthraquinone, (27) 3-(2,3,5,6-tetrachloroanilino)-2-(2,6-dimethoxyphenoxy)-1,4-difluoroanthraquinone, (28) 2,3-dianilino-1,4-difluoroanthraquinone, (29) 2,3-bis(p-tert-butylanilino)-1,4-difluoroanthraquinone, (30) 2,3-bis(p-methoxyanilino)-1,4-difluoroanthraquinone, (31) 2,3-bis(2-meth(xy-6-methylanilino)-1,4-difluoroanthraquinone, (32) 2,3-bis(2,6-diisopropylanilino)-1,4-difluoroanthraquinone, (33) 2,3-bis(2,4,6-trichloroanilino)-1,4-difluoroanthraquinone, (34) 2,3-bis(2,3,5,6-tetrachloroanilino)-1,4-difluoroanthraquinone, (35) 2,3-bis(2,3,5,6-tetrafluoroanilino)-1,4-difluoroanthraquinone, (36) 2,3-bis(p-cyanoanilino)-1-methoxyethoxy-4-fluoroanthraquinone, (37) 2-(2,6-dichloroanilino)-1,3,4-trichloroanthraquinone, (38) 2-(2,3,5,6-tetrafluoroanilino)-1,3,4-trichloroanthraquinone, (39) 3-(2,6-dichloroanilino)-2-(2,6-dichlorophenoxy)-1,4-dichloroanthraquinone, (40) 2-(2,6-dichloroanilino)anthraquinone, (41) 2-(2,3,5,6-tetrafluoroanilino)anthraquinone, (42) 3-(2,6-dichloroanilino)-2-(2,6-dichlorophenoxy) anthraquinone, (43) 2,3-bis(2-methoxy-6-methylanilino)-1,4-dichloroanthraquinone, (44) 2,3-bis(2,6-diisopropylanilino) anthraquinone, (45) 2-butylamino-1,3,4-trifluoroanthraquinone, (46) 1,4-bis(n-butylamino)-2,3-difluoroanthraquinone (47) 1,4-bis(n-octylamino)-2,3-difluoroanthraquinone, (48) 1,4-bis(hydroxyethylamino)-2,3-difluoroanthraquinone, (49) 1,4-bis(cyclohexylamino)-2,3-difluoroanthraquinone, (50) 1,4-bis(cyclohexylamino)-2-octyloxy-3-fluoroanthraquinone, (51) 1,2,4-tris(2,4-dimethoxyphenoxy)-3-fluoroanthraquinone, (52) 2,3-bis(phenylthio)-1-phenoxy-4-fluoroanthraquinone, (53) 1,2,3,4-tetra(p-methoxyphenoxy)anthraquinone, and the like.

By blending such an anthraquinone-based coloring agent, it is possible to absorb light in a wavelength range of 450 nm to 600 nm out of light incident on the specific wavelength absorption layer 11. It is preferable to have an absorption peak in a wavelength range of 500 nm to 600 nm.

Examples of the perylene-based coloring agent include N,N'-dimethylperylene-3,4,9,10-tetracarboxylic diimide, N,N'-diethylperylene-3,4,9,10-tetracarboxylic diimide, N,N'-bis(4-methoxyphenyl)-perylene-3,4,9,10-tetracarboxylic diimide, N,N'-bis(4-ethoxyphenyl)-perylene-3,4,9,10-tetracarboxylic diimide, N,N'-bis(4-chlorophenyl)-perylene-3,4,9,10-tetracarboxylic diimide, and the like, and particularly preferable examples thereof include N,N'-bis(3,5-dimethylphenyl)-perylene-3,4,9,10-tetracarboxylic diimide and the like.

By blending such a perylene-based coloring agent, it is possible to absorb light in a wavelength range of 400 nm to 800 nm out of the light incident on the specific wavelength absorption layer 11. It is preferable to have an absorption peak in a wavelength range of 600 nm to 780 nm.

By blending the light absorbing agent as described above, it is possible to absorb light in a specific wavelength range. Therefore, for example, the user can clearly recognize the outline of an object or a person in a mounted state, and can enhance safety.

A content of the light absorbing agent (total of each light absorbing agent) in the specific wavelength absorption layer 11 is preferably 0.001 wt % to 5 wt %, and more preferably 0.003 wt % to 4 wt %. With this, it is possible to reliably exhibit the above effect. In a case where the content is too small, the effect as a light absorbing agent may not be sufficiently obtained. On the other hand, in a case where the content is too large, the light absorbing agent tends to be easily aggregated.

<Ultraviolet Absorbing Agent>

The ultraviolet absorbing agent absorbs ultraviolet rays (light in a wavelength range of 100 nm to 420 nm).

The ultraviolet absorbing agent is not particularly limited, but examples thereof include a triazine-based compound, a benzophenone-based compound, a benzotriazole-based compound, and a cyanoacrylate-based compound, and one or two or more of these can be used in combination. Among these, a triazine-based compound is particularly preferably used. With this, it is possible to prevent or suppress deterioration of the specific wavelength absorption layer 11 (polycarbonate and light absorbing agent) due to ultraviolet rays and to enhance weather resistance of the optical sheet 1.

Examples of the triazine-based compound include 2-mono (hydroxyphenyl)-1,3,5-triazine compound, 2,4-bis(hydroxyphenyl)-1,3,5-triazine compound, and 2,4,6-tris(hydroxyphenyl)-1,3,5-triazine compound, and specific examples thereof include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3-5-triazine, 2,4,6-tris(2-hydroxy-4-methoxyphenyl)nyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris 2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy Ci-3-methyl-4-(1-(2-ethoxyhexyloxy)-1-oxopropan-2-yloxy)phenyl)-1,3,5-triazine, and the like. Examples of commercially available products of triazine-based ultraviolet absorbing agents include "Tinuvin 1577", "Tinuvin 460", "Tinuvin 477" (manufactured by BASF Japan), "ADEKA STAB LA-F70" (manufactured by ADEKA), and the like.

The specific wavelength absorption layer 11 further includes an ultraviolet absorbing agent that absorbs light in the wavelength range of 100 nm to 420 nm or less as described above, and thus it is possible to absorb light in a wavelength range of 100 nm to 420 nm out of light incident on the specific wavelength absorption layer 11. With this, it is possible to prevent or suppress deterioration of the specific wavelength absorption layer 11 (polycarbonate and light absorbing agent) due to ultraviolet rays and to enhance weather resistance of the optical sheet 1.

A content of the ultraviolet absorbing agent in the specific wavelength absorption layer 11 is preferably 0.05 wt % to 8 wt %, and more preferably 0.07 wt % to 6 wt %. With this, it is possible to reliably exhibit the above effect. In a case where the content is too small, the effect as an ultraviolet absorbing agent may not be sufficiently obtained. On the other hand, in a case where the content is too large, the ultraviolet absorbing agent tends to be easily aggregated.

Here, the content of the ultraviolet absorbing agent in the specific wavelength absorption layer 11 is larger than the content of the light absorbing agent in the specific wavelength absorption layer 11. With this, the optical sheet 1 can absorb light in a specific wavelength range out of visible light, and can also absorb ultraviolet rays. In particular, the light absorbing agent is relatively easily deteriorated by ultraviolet rays, but this deterioration can be prevented. In addition, since the content of the ultraviolet absorbing agent in the specific wavelength absorption layer 11 is larger than the content of the light absorbing agent in the specific wavelength absorption layer 11, it is possible to prevent the light absorbing agent from being deteriorated by ultraviolet rays.

A ratio A/B of the content A of the light absorbing agent in the specific wavelength absorption layer 11 to the content B of the ultraviolet absorbing agent in the specific wavelength absorption layer 11 is preferably 0.000125 to 0.625, and more preferably 0.00015 to 0.4. With this, the effect of the present invention is more remarkably obtained.

A thickness of the specific wavelength absorption layer 11 is not particularly limited, but is preferably 0.05 mm to 1.5 mm, and more preferably 0.3 mm to 0.7 mm. With this, it is possible to enhance handleability and to prevent the optical component as a whole from being unnecessarily thick.

In addition, the specific wavelength absorption layer 11 may be manufactured by stretching or may be manufactured without stretching, but the stretching degree is preferably 10% or less, and more preferably 5% or less. With this, it is possible to prevent or suppress occurrence of color unevenness, unevenness of a light absorbing agent, and unevenness of an ultraviolet absorbing agent during stretching.

In a case where a melting point of polycarbonate is denoted by T1 and a melting point of a light absorbing agent is denoted by T2, it is preferable that T1 <T2 is satisfied. With this, in a case where the polycarbonate in a molten state and the light absorbing agent are mixed with each other, it is possible to prevent the light absorbing agent from being the light absorber can be prevented from being changed in quality or discolored by heat.

In a case where the melting point of polycarbonate is denoted by T1 and the melting point of the ultraviolet absorbing agent is denoted by T3, it is preferable that T1 <T3 is satisfied. With this, in a case where the polycarbonate in a molten state and the light absorbing agent are mixed with each other, it is possible to prevent the ultraviolet absorbing agent from being changed in quality or discolored by heat.

The melting point T1 of the polycarbonate is preferably 250° C. to 400° C., and more preferably 270° C. to 350° C.

The melting point T2 of the light absorbing agent is preferably 300° C. to 400° C., and more preferably 330° C. to 360° C. In addition, the melting point T3 of the ultraviolet absorbing agent is preferably 310° C. to 370° C., and more preferably 340° C. to 360° C. By setting the melting points T1 to T3 within the above numerical value range, it is possible to reliably exhibit the above effect.

The light absorbing agent may be a coloring agent different from the coloring agents exemplified above. The coloring agent is not particularly limited, and examples thereof include a pigment, a dye, and the like, and these can be used alone or used by being mixed together. In addition, it is possible to use the coloring agent by being mixed with those described above.

The pigment is not particularly limited, and examples thereof include phthalocyanine-based pigments such as phthalocyanine green and phthalocyanine blue, azo-based pigments such as fast yellow, disazo yellow, condensed azo yellow, penzoimidazolone yellow, dinitroaniline orange, penzimidazolone orange, toluidine red, permanent carmine, permanent red, naphthol red, condensed azo red, benzimidazolone carmine, and benzimidazolone brown, anthraquinone-based pigments such as anthrapyrimidine yellow and anthraquinonyl red, azomethine-based pigments such as copper azomethine yellow, quinophthalone-based pigments such as quinophthalone yellow, isoindoline-based pigments such as isoindoline yellow, nitroso-based pigments such as nickel dioxime yellow, perinone-based pigments such as perinone orange, quinacridone-based pigments such as quinacridone magenta, quinacridone maroon, quinacridone scarlet, and quinacridone red, perylene red, perylene-based pigments such as perylene maroon, pyrrolopyrrole-based pigments such as diketopyrrolopyrrole red, organic pigments such as dioxazine-based pigments such as dioxazine violet, carbon-based pigments such as carbon black, lamp black, furnace black, ivory black, graphite, and fullerene, chromate-based pigments such as chrome yellow and molybdate orange, sulfide-based pigments such as cadmium yellow, cadmium lithopone yellow, cadmium orange, cadmium lithopone orange, silver vermilion, cadmium red, cadmium lithopone red, and sulfidation, oxide-based pigments such as ocher, titanium yellow, titanium barium nickel yellow, red iron, lead red, amber, brown iron oxide, zinc iron chrome brown, chromium oxide, cobalt green, cobalt chrome green, titanium cobalt green, cobalt blue, cerulean blue, cobalt aluminum chrome blue, and iron black, manganese ferrite black, cobalt ferrite black, copper chromium black, and copper chromium manganese black, hydroxide-based pigments such as viridian, ferrocyanide-based pigments such as Prussian blue, silicate-based pigments such as ultramarine blue, phosphate-based pigments such as cobalt violet and mineral violet, and inorganic pigments such as others (for example, cadmium sulfide, cadmium selenide, and the like), and the like, and one or two or more of these can be used in combination.

The dye is not particularly limited, and examples thereof include metal complex coloring agent, cyan-based coloring agent, xanthene-based coloring agent, azo-based coloring agent, hibiscus coloring agent, blackberry coloring agent, raspberry coloring agent, pomegranate juice coloring agent, chlorophyll coloring agent, porphyrin-based compounds such as tetraazoporphyrin compound, merocyanine dye, and the like, and one or two or more of these can be used in combination.

Among these, the light absorbing agent preferably contains at least one selected from the group consisting of a phthalocyanine-based pigment, a porphyrin compound, and a merocyanine dye. With this, the effect of the present invention is more remarkably obtained.

<Polarized Layer>

The polarized layer 12 has a function of extracting linearly polarized light having a polarization plane in a predetermined direction from incident light (natural light that is not polarized). With this, the incident light incident on the eye via the optical sheet 1 is polarized.

A polarization degree of the polarized layer 12 is not particularly limited, but is preferably 50% to 100%, and more preferably 80% to 100%, for example. In addition, the visible light transmittance of the polarized layer 12 is not particularly limited, but is preferably 10% to 80%, and more preferably 20% to 50%, for example.

The constituent material of such a polarized layer 12 is not particularly limited as long as the material has the above function, but examples thereof include a material obtained by adsorbing and dyeing a dichroic substance such as iodine and dichroic dye onto a polymer film formed of polyvinyl alcohol (PVA), partially formalized polyvinyl alcohol, polyethylene vinyl alcohol, polyvinyl butyral, polycarbonate, a partially saponified product ethylene-vinyl acetate copolymer, and the like, and performing uniaxial stretching, a polyene-based oriented film of a dehydrated product of polyvinyl alcohol and a dechlorinated product of polyvinyl chloride, and the like.

Among these, the polarized layer 12 is those obtained by adsorbing and dyeing iodine or a dichroic dye onto a polymer film containing polyvinyl alcohol (PVA) as a main material and performing uniaxial stretching. Polyvinyl alcohol (PVA) is a material that is excellent in transparency, heat resistance, affinity for iodine or a dichroic dye which is a dyeing agent, and orientation during stretching. Therefore, the polarized layer 12 mainly formed of PVA is excellent in heat resistance and excellent in polarizing function.

Examples of the dichroic dye include chloratin fast red, congo red, brilliant blue 6B, benzoperpurine, chlorazole black BH, direct blue 2B, diamine green, chrysophenone, sirius yellow, direct fast red, acid black, and the like.

A thickness of the polarized layer 12 is not particularly limited, and is preferably 5 μm to 60, and more preferably 10 μm to 40 μm.

<Adhesive Layer>

The adhesive (or pressure-sensitive adhesive) constituting the adhesive layer 13 is not particularly limited, and examples thereof include an acrylic adhesive, a urethane adhesive, an epoxy adhesive, a silicone adhesive, and the like.

Among these, the urethane-based adhesive is preferable. With this, it is possible to make transparency, adhesion strength, and durability of the adhesive layer 13 further excellent, and to make properties of following a change in shape particularly excellent.

According to this embodiment, the same effects as those of the first embodiment can be obtained, and the present embodiment has a polarization function.

Subsequently, a method for manufacturing an optical sheet and a method for manufacturing an optical component will be described. Hereinafter, a case where an optical sheet is manufactured using an extrusion method will be described as an example.

(Method for Manufacturing Optical Sheet)

First, an optical sheet manufacturing apparatus used in the present manufacturing method will be described.

Figure 3:
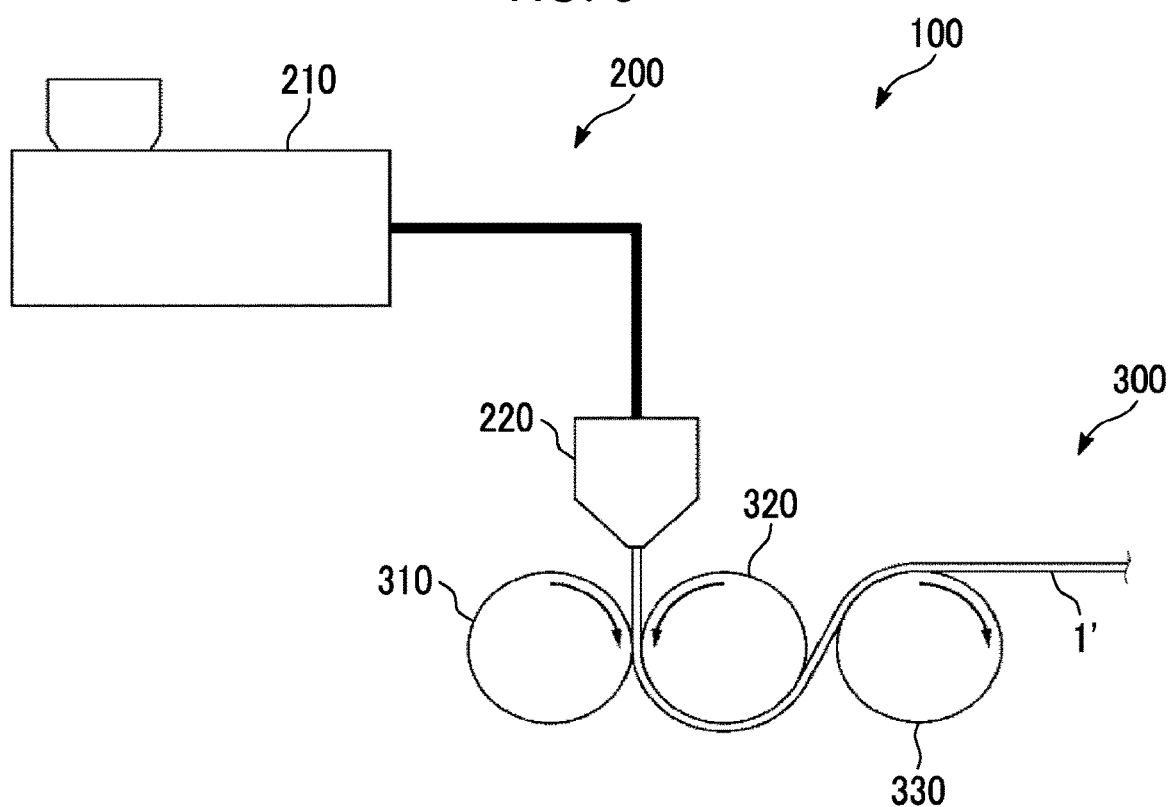
FIG. 3 is a side view schematically showing an optical sheet manufacturing apparatus for manufacturing the optical sheet shown in FIG. 1.
Figure 4:
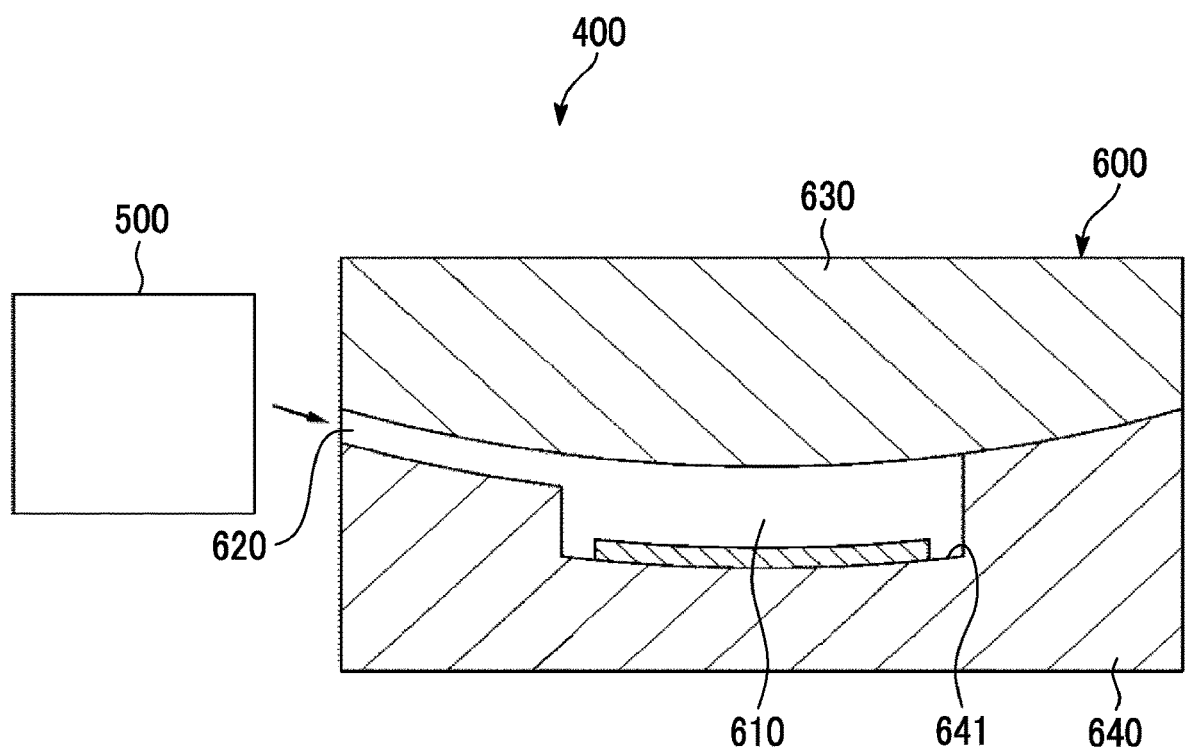
FIG. 4 is a sectional view schematically showing an optical component manufacturing apparatus for manufacturing the optical sheet optical component shown in FIG. 1.

FIG. 3 is a side view schematically showing an optical sheet manufacturing apparatus for manufacturing the optical sheet shown in FIG. 1. FIG. 4 is a sectional view schematically showing an optical component manufacturing apparatus for manufacturing the optical sheet optical component shown in FIG. 1. In the following description, the upper side in FIG. 4 is referred to as "upper", and the lower side is referred to as "lower".

The optical sheet manufacturing apparatus 100 shown in FIG. 3 includes a sheet supply unit 200 and a sheet molding unit 300.

In the present embodiment, the sheet supply unit 200 includes an extruder 210 and a T-die 220 connected to a molten resin discharge unit of the extruder 210 via a pipe. A belt-shaped sheet 1' in a molten state or a softened state is supplied to the sheet molding unit 300 by the T-die 220.

The T-die 220 is an extrusion forming unit that extrudes the sheet 1' in a molten state or a softened state by an extrusion method in a state of a belt-shaped sheet. A constituent material constituting the optical sheet 1 described above is loaded in the T-die 220 in a molten state, and by extruding the material in the molten state from the T-die 220, the belt-shaped sheet 1' is continuously fed.

The sheet molding unit 300 includes a touch roll 310, a cooling roll 320, and a post-stage cooling roll 330. Each of these rolls is configured to rotate independently by a motor (driving means) (not illustrated), and is continuously fed by being cooled by the rotation of these rolls. By continuously feeding the sheet 1' into the sheet molding unit 300, a surface of the sheet 1' is flattened, and the sheet 1' is set to a desired thickness and cooled. Then, the cooled sheet 1' is cut into a predetermined length.

The optical sheet of the present embodiment is manufactured by the optical sheet manufacturing method using the optical sheet manufacturing apparatus 100 as described above.

Manufacturing of the optical sheet includes an extrusion step, a molding step, and a cooling step.

First, a belt-shaped sheet 1' in a molten state or a softened state is extruded (an extrusion step). In this extrusion step, the constituent material of the optical sheet 1 (polycarbonate, light absorbing agent, ultraviolet absorbing agent, and the like) are loaded into the extruder 210. In addition, the constituent material of the optical sheet 1 is in a molten or softened state in the extruder 210, and is in a state in which the polycarbonate, the light absorbing agent, and the ultraviolet absorbing agent are sufficiently mixed with one another. By extruding these in a sufficiently mixed state, in the optical sheet 1 obtained through a molding step and a cooling step described below, it is possible to prevent the light absorbing agent and the ultraviolet absorbing agent from being excessively aggregated.

Subsequently, the surface of the sheet 1' is flattened, and the sheet 1' is set to a predetermined thickness (molding step). The present step is performed between the touch roll 310 and the cooling roll 320.

Subsequently, the surface of the sheet 1' is cooled (cooling step). The present step is performed between the cooling roll 320 and the post-stage cooling roll 330.

Through the above steps, it is possible to obtain the specific wavelength absorption layer 11.

On the other hand, a polyvinyl alcohol sheet containing the dye described above or the like is prepared and stretched in one direction to obtain the polarized layer 12.

Subsequently, an adhesive 13 is applied on the cut sheet 1' (specific wavelength absorption layer 11), the polarized layer 12 is laminated on the adhesive layer 13, and the adhesive 13 is cured to obtain the optical sheet 1.

Subsequently, a method for manufacturing an optical component will be described.

(Method for Manufacturing Optical Component)

First, an optical component manufacturing apparatus used in the present manufacturing method will be described.

The optical component manufacturing apparatus 400 shown in FIG. 4 includes a resin supply unit 500 and a mold 600. The resin supply unit 500 is filled with the above-described polycarbonate. The mold 600 has a cavity 610 and a supply port 620 communicating inside and outside the cavity 610. In addition, the mold 600 includes an upper member 630 and a lower member 640, and in a state where these components are assembled, the mold 600 that defines the optical component manufacturing apparatus 400 is configured.

The optical component manufacturing apparatus of the present embodiment is manufactured by a manufacturing method of the optical sheet manufacturing apparatus using the optical component manufacturing apparatus 400 as described above.

The method for manufacturing an optical component includes an optical sheet arranging step and a lens material supplying step.

First, in a state where the upper member 630 and the lower member 640 are disassembled, the optical sheet 1 is arranged on a bottom surface 641 of the lower member 640 (optical sheet arranging step). The bottom surface 641 is a curved concave surface, and with this, it is possible to form a curved surface on the lens 4. In addition, the optical sheet 1 has flexibility, and thus is arranged according to the shape of the bottom surface 641.

Figure 6:
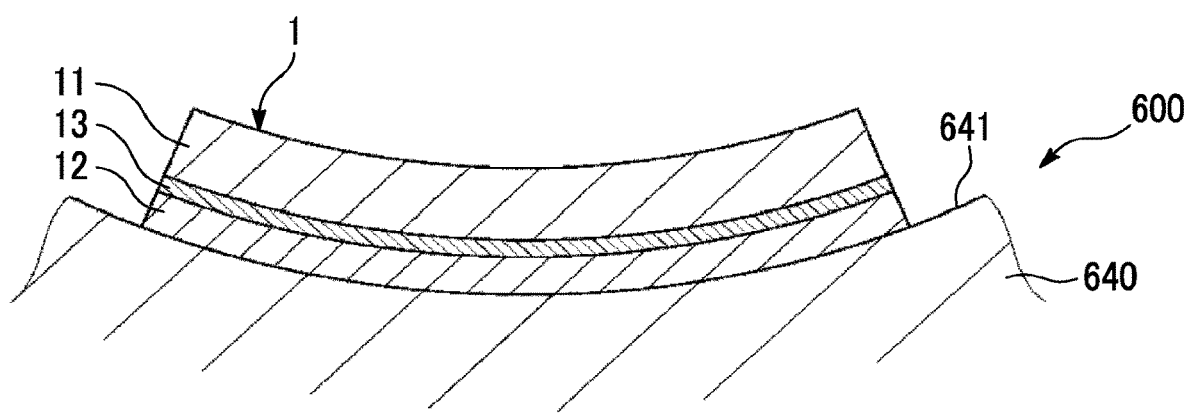
FIG. 6 is a cross-sectional view showing a state where the optical sheet shown in FIG. 5 is arranged in a mold.

Here, in a case where the optical sheet 1 is placed on a bottom surface 641, and as shown in FIG. 6, the polarized sheet 12 is arranged so as to be in contact with the bottom surface 641. With this, it is possible to prevent the bottom surface 641 and the specific wavelength absorption layer 11 from being directly brought into contact with each other. Therefore, it is possible to prevent the light absorbing agent of the specific wavelength absorption layer 11 from being changed in quality by the heat directly transmitted from the bottom surface 641. As described above, the optical sheet 1 is excellent in moldability and optical characteristics.

Subsequently, the upper member 630 and the lower member 640 are in an assembled state, and a lens material in a molten state or a softened state is poured through the supply port 620 (lens material supply step). By cooling the lens material in a molten state or a softened state, it is possible to obtain a laminate in which the optical sheet 1 and the lens are laminated.

The preferable embodiments of the present invention have been described above, but the present invention is not limited to the above-description, and modifications, improvements, and the like within a scope in which the object of the present invention can be achieved are included in the present invention.

For example, each unit constituting the optical sheet of the present invention can be replaced with an arbitrary constituent element exhibiting the same function.

In addition, the optical sheet of the present invention may have an arbitrary constituent components in addition to the above-described configuration.

More specifically, for example, the optical sheet of the present invention may include a protective layer for protecting a surface, an intermediate layer, a power adjustment layer for adjusting the power as a lens, and the like.

EXAMPLES

Hereinafter, the present invention will be described more specifically based on examples.
1. Examination of Optical Sheet
1-1. Preparation of Optical Sheet Example 1

[1] First, 100 parts by mass of a bisphenol A-type polycarbonate ("Lupilon E2000F E5111" manufactured by Mitsubishi Gas Chemical Company), 0.04 parts by mass of a light absorbing agent ("FDG-005" manufactured by Yamada Chemical Industries, Ltd.), and 0.4 parts by mass of an ultraviolet absorbing agent ("ADEKA STAB LA-31G" manufactured by Adeka Corporation) were stirred and mixed to prepare a specific wavelength absorption layer forming material.

[2] Subsequently, the specific wavelength absorption layer forming material was accommodated in the extruder 210 of the optical sheet manufacturing apparatus 100 shown in FIG. 3, melted, and extruded from the T-die 220 to obtain a sheet material. The sheet material was cooled and molded in a sheet molding unit 300, and cut into a rectangular shape having an average thickness of 0.3 mm and a size of 500 mm×500 mm in plan view to prepare a specific wavelength absorption layer.

[3] On the other hand, polyvinyl alcohol ("VF-PS" manufactured by Kuraray Corporation) was prepared and stretched in one direction so that the stretching degree was 400% to obtain a polarized layer.

[4] Subsequently, as an adhesive, a two-pack moisture-curable type polyurethane adhesive (main agent: Takelac A-520, manufactured by Mitsui Chemicals, Inc., curing agent: Takenate A-50, manufactured by Mitsui Chemicals, Inc.) was applied onto a surface of the specific wavelength absorption layer so that the thickness after curing became 20 μm, and a polarized layer was laminated thereon and cured to obtain an optical sheet 1.

The viscosity average molecular weight Mv of the polycarbonate is 27,000, the melting point $T_1$ is 250° C., the melt flow rate measured in accordance with JISK7210 is 5.3 g/10 min, and the water absorption rate measured by Aquatrac 3E (manufactured by Brabender Corporation) was 0.05%. In addition, the melting point $T_2$ of the light absorbing agent was 440° C. In addition, the melting point $T_3$ of the ultraviolet absorbing agent was 200° C.

Example 2

An optical sheet of Example 2 was obtained in the same manner as in Example 1 except that the configuration of the optical sheet was changed as shown in Table 1.

Example 3

An optical sheet of Example 3 was obtained in the same manner as in Example 1 except that the configuration of the optical sheet was changed as shown in Table 1.

Example 4

An optical sheet of Example 4 was obtained in the same manner as in Example 1 except that the configuration of the optical sheet was changed as shown in Table 1.

Example 5

An optical sheet of Example 5 was obtained in the same manner as in Example 1 except that the configuration of the optical sheet was changed as shown in Table 1.

Example 6

An optical sheet of Example 6 was obtained in the same manner as in Example 1 except that the configuration of the optical sheet was changed as shown in Table 1.

Example 7

An optical sheet of Example 7 was obtained in the same manner as in Example 1 except that the configuration of the optical sheet was changed as shown in Table 1.

Example 8

An optical sheet of Example 8 was obtained in the same manner as in Example 1 except that the configuration of the optical sheet was changed as shown in Table 1.

Example 9

An optical sheet of Example 9 was obtained in the same manner as in Example 1 except that the configuration of the optical sheet was changed as shown in Table 1.

Example 10

An optical sheet of Example 10 was obtained in the same manner as in Example 1 except that the configuration of the optical sheet was changed as shown in Table 1.

Example 11

An optical sheet of Example 11 was obtained in the same manner as in Example 1 except that the configuration of the optical sheet was changed as shown in Table 1.

In Table 1, a1 represents polycarbonate ("E2000FN E5100" manufactured by Mitsubishi Gas Chemical Company), a2 represents polycarbonate ("H3000" manufactured by Mitsubishi Gas Chemical Company), a3 represents polycarbonate ("200-3NAT" manufactured by Sumika Polycarbonate Limited), and a4 represents polycarbonate ("S2000" manufactured by Mitsubishi Gas Chemical Co., Ltd.).

In addition, in Table 1, b1 represents a light absorbing agent ("FDG-005" manufactured by Yamada Chemical Industry Co., Ltd.), b2 represents a light absorbing agent ("FDG-002" manufactured by Yamada Chemical Industry Co., Ltd.), b3 represents a light absorbing agent ("FDB-001" manufactured by Yamada Chemical Industry Co., Ltd.), b4 represents a light absorbing agent ("FDR-002" manufactured by Yamada Chemical Industry Co., Ltd.), and b5 represents a light absorbing agent ("FDR-005" manufactured by Yamada Chemical Industry Co., Ltd.).

In addition, in Table 1, c represents an ultraviolet absorbing agent ("ADEKA STAB LA-31G" manufactured by ADEKA Corporation).

1-2. Evaluation

The optical sheet of each example was evaluated by the following method.

(Aggregability Evaluation)

Observation was performed using a digital microscope ("VHX-1000" manufactured by Keyence Corporation), a size of the aggregate was measured, and evaluation was performed as follows.

A: The size of the aggregate is less than 0.05 mm$^2$.
B: The size of the aggregate is equal to or more than 0.05 mm$^2$ and less than 0.1 mm$^2$.
C: The size of the aggregate is equal to or more than 0.1 mm$^2$ and less than 0.5 mm$^2$.
D: The size of the aggregate is less than 0.5 mm$^2$.

(Strength Evaluation)

Charpy impact strength was measured in accordance with ISO179-1 and ISO179-2, and evaluated as follows.

A: Equal to or more than 80 KJ/m$^2$.
B: Equal to or more than 50 KJ/m$^2$ and less than 80 KJ/m$^2$.
C: Equal to or more than 25 KJ/m$^2$ and less than 50 KJ/m$^2$.
D: Less than 25 KJ/m$^2$.

(Weather Resistance Evaluation)

A xenon lamp (7.5 kw, output: 1.728 MJ/m$^2$) (light source filter: daylight filter, irradiance: broadband (300 to 400 nm), 60±2 W/m$^2$) was irradiated for 8 hours, and a yellowing degree (ΔYI) was evaluated as follows.

A: Appearance was not changed at ΔYI of less than 1.0.
B: Appearance was changed a little at ΔYI of equal to or more than 1.0 and less than 2.0.
C: A change in appearance was observed at ΔYI of equal to or more than 2.0 and less than 3.0.
D: A change in appearance was remarkably observed at ΔYI of equal to or more than 3.0.

The evaluation result of the optical sheets of each example obtained as described above are shown in Table 1 below.

TABLE 1

| | | | Example 1 | Example 2 | Example 3 | Example 4 | Example 5 | Example 6 |
|---|---|---|---|---|---|---|---|---|
| Specific wavelength absorption layer | Polycarbonate | Type | a1 | a2 | a3 | a4 | a1 | a1 |
| | | Comment (%) | 100 | 100 | 100 | 100 | 100 | 100 |
| | | Viscosity average molecular weight | 27000 | 20000 | 30000 | 23000 | 27000 | 27000 |
| | | Water absorption rate | 0.05 | 0.05 | 0.05 | 0.05 | 0.05 | 0.05 |
| | | Melt flow rate (g/10 min) | 5.3 | 28 | 3 | 9 | 5.3 | 5.3 |
| | | Melting point T1 (° C.) | 250 | 250 | 250 | 250 | 250 | 250 |
| | Light absorbing agent | Type | b1 | b1 | b1 | b1 | b2 | b3 |
| | | Content (wt %) | 0.04 | 0.04 | 0.04 | 0.04 | 0.04 | 0.03 |
| | | Melting point T2 (° C.) | 440 | 440 | 440 | 440 | 300 | 370 |
| | Ultraviolet absorbing agent | Type | c | c | c | c | c | c |
| | | Content (wt %) | 0.4 | 0.4 | 0.4 | 0.4 | 0.4 | 0.05 |
| | | Melting point T3 (° C.) | 200 | 200 | 200 | 200 | 200 | 200 |
| | | Content ratio | 0.1 | 0.1 | 0.1 | 0.1 | 0.1 | 0.6 |

TABLE 1-continued

| Evaluation | Aggregability | A | A | B | A | B | A |
| --- | --- | --- | --- | --- | --- | --- | --- |
| | Strength | A | B | A | A | A | A |
| | Weather resistance | A | A | A | A | A | A |

| | | | Example 7 | Example 8 | Example 9 | Example 10 | Example 11 |
| --- | --- | --- | --- | --- | --- | --- | --- |
| Specific wavelength absorption layer | Polycarbonate | Type | a1 | a1 | a1 | a1 | a1 |
| | | Comment (%) | 100 | 100 | 100 | 100 | 100 |
| | | Viscosity average molecular weight | 27000 | 27000 | 27000 | 27000 | 27000 |
| | | Water absorption rate | 0.02 | 0.05 | 0.05 | 0.05 | 0.05 |
| | | Melt flow rate (g/10 min) | 5.3 | 5.3 | 5.3 | 5.3 | 5.3 |
| | | Melting point T1 (° C.) | 250 | 250 | 25C | 250 | 250 |
| | Light absorbing agent | Type | b1 | b4 | b5 | b4 | b5 |
| | | Content (wt %) | 5 | 0.04 | 0.04 | 5 | 5 |
| | | Melting point T2 (° C.) | 440 | 440 | 440 | 440 | 440 |
| | Ultraviolet absorbing agent | Type | c | c | c | c | c |
| | | Content (wt %) | 8 | 0.4 | 0.4 | 8 | 8 |
| | | Melting point T3 (° C.) | 200 | 200 | 200 | 200 | 200 |
| | | Content ratio | 0.625 | 0.1 | 0.1 | 0.625 | 0.625 |
| Evaluation | | Aggregability | B | A | B | A | B |
| | | Strength | A | A | A | A | A |
| | | Weather resistance | A | A | A | A | A |

As shown in Table 1, there was obtained a result in which the optical sheet in each example was excellent in aggregability, strength, and weather resistance.

INDUSTRIAL APPLICABILITY

The optical sheet of the present invention is an optical sheet that has flexibility and is used in a curved state of being curved in one direction, and the optical sheet includes a polarized layer for polarizing incident light and a specific wavelength absorption layer provided in a curved concave side from the polarized layer and containing a resin material and a light absorbing agent that absorbs light in a specific wavelength range out of light in a wavelength range of 350 nm to 740 nm. Accordingly, the optical sheet has a polarizing function and can absorb light of a specific wavelength. In addition, in a case where the optical sheet 1 is placed on a mold, and a resin material to be a lens is supplied thereon to form a lens with an optical sheet (optical component) in which the lens and the optical sheet are integrated, it is possible to prevent the mold and the specific wavelength absorption layer from being brought into contact with each other. Therefore, it is possible to prevent the specific wavelength absorption layer from being changed in quality by the heat directly transmitted from the mold. As described above, the optical sheet is excellent in moldability and optical characteristics.

REFERENCE SIGNS LIST

1 Optical sheet
1' Sheet
1A Optical sheet
2 Frame
3 Lens with optical sheet
4 Lens
5 Mounting portion
6 Collar
7 Light transmitting member
10 Optical component
10' Optical component
11 Specific wavelength absorption layer
12 Polarized layer
13 Adhesive layer
21 Rim portion
22 Bridge portion
23 Temple portion
24 Nose pad portion
100 Optical sheet manufacturing apparatus
200 Sheet supply unit
210 Extruder
211 Molten resin discharge unit
212 Pipe
220 T-die
300 Sheet molding unit
310 Touch roll
320 Cooling roll
330 Post-stage cooling roll
400 Optical component manufacturing apparatus
500 Resin supply unit
600 Mold
610 Cavity
620 Supply port
630 Upper member
640 Lower member
641 Bottom surface

The invention claimed is:

1. An optical sheet having flexibility, comprising:
a polarized layer that polarizes incident light and includes polyvinyl alcohol;
a specific wavelength absorption layer positioned on a curved concave side of the polarized layer and comprising a bisphenol A-type polycarbonate and a light absorbing agent such that the bisphenol A-type polycarbonate has a content in a range of 87 wt % to 99.949 wt % and that the light absorbing agent absorbs light in a specific wavelength range out of light in a wavelength range of 350 nm to 740 nm; and an adhesive layer comprising an urethane-based adhesive that bonds the polarized layer and the specific wavelength absorption layer,
wherein the bisphenol A-type polycarbonate has a viscosity average molecular weight Mv in a range of 23,000 to 28,000, and a melt flow rate in a range of 5.3 g/10 min to 28 g/10 min measured in accordance with JIS K7210.

2. The optical sheet according to claim 1, wherein the bisphenol A-type polycarbonate has a water absorption rate in a range of 0.02% to 0.2%.

3. The optical sheet according to claim 2, wherein the specific wavelength absorption layer is formed such that the bisphenol A-type polycarbonate and the light absorbing agent satisfy T1<T2, where T1 is a melting point of the bisphenol A-type polycarbonate, and T2 is a melting point of the light absorbing agent.

4. The optical sheet according to claim 2, wherein the specific wavelength absorption layer has a stretching degree of 10% or less.

5. The optical sheet according to claim 2, wherein the specific wavelength absorption layer further includes an ultraviolet absorbing agent that absorbs light in a wavelength range of 100 nm to 420 nm.

6. The optical sheet according to claim 2, wherein the light absorbing agent contains at least one selected from the group consisting of a phthalocyanine-based pigment, a porphyrin-based compound, and a merocyanine dye.

7. An optical component comprising:
a substrate; and
the optical sheet of claim 2 such that the optical sheet is laminated on the substrate.

8. The optical sheet according to claim 1, wherein the specific wavelength absorption layer is formed such that the bisphenol A-type polycarbonate and the light absorbing agent satisfy T1<T2, where T1 is a melting point of the bisphenol A-type polycarbonate, and T2 is a melting point of the light absorbing agent.

9. The optical sheet according to claim 8, wherein the specific wavelength absorption layer has a stretching degree of 10% or less.

10. The optical sheet according to claim 8, wherein the specific wavelength absorption layer further includes an ultraviolet absorbing agent that absorbs light in a wavelength range of 100 nm to 420 nm.

11. The optical sheet according to claim 8, wherein the light absorbing agent contains at least one selected from the group consisting of a phthalocyanine-based pigment, a porphyrin-based compound, and a merocyanine dye.

12. An optical component comprising:
a substrate; and
optical sheet of claim 8 such that the optical sheet is laminated on the substrate.

13. The optical sheet according to claim 1, wherein the specific wavelength absorption layer has a stretching degree of 10% or less.

14. The optical sheet according to claim 13, wherein the specific wavelength absorption layer further includes an ultraviolet absorbing agent that absorbs light in a wavelength range of 100 nm to 420 nm.

15. The optical sheet according to claim 13, wherein the light absorbing agent contains at least one selected from the group consisting of a phthalocyanine-based pigment, a porphyrin-based compound, and a merocyanine dye.

16. An optical component comprising:
a substrate; and
the optical sheet of claim 13 such that the optical sheet is laminated on the substrate.

17. The optical sheet according to claim 1, wherein the specific wavelength absorption layer further includes an ultraviolet absorbing agent that absorbs light in a wavelength range of 100 nm to 420 nm.

18. The optical sheet according to claim 17, wherein the light absorbing agent contains at least one selected from the group consisting of a phthalocyanine-based pigment, a porphyrin-based compound, and a merocyanine dye.

19. The optical sheet according to claim 1, wherein the light absorbing agent contains at least one selected from the group consisting of a phthalocyanine-based pigment, a porphyrin-based compound, and a merocyanine dye.

20. An optical component comprising:
a substrate; and
the optical sheet of claim 1 such that the optical sheet is laminated on the substrate.

21. The optical sheet according to claim 1, wherein the bisphenol A-type polycarbonate has the melt flow rate in a range of 5.3 g/10 min to 25 g/10 min measured in accordance with JIS K7210.

* * * * *